United States Patent
Cakulev et al.

(10) Patent No.: US 8,995,959 B2
(45) Date of Patent: Mar. 31, 2015

(54) PREVENTION OF MISMATCH OF AUTHENTICATION PARAMETER IN HYBRID COMMUNICATION SYSTEM

(75) Inventors: Violeta Cakulev, Millburn, NJ (US); Semyon B. Mizikovsky, Morganville, NJ (US); David A. Rossetti, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 511 days.

(21) Appl. No.: 13/237,032

(22) Filed: Sep. 20, 2011

(65) Prior Publication Data

US 2013/0072156 A1 Mar. 21, 2013

(51) Int. Cl.
*H04M 1/66* (2006.01)
*H04W 12/06* (2009.01)
*H04L 29/06* (2006.01)
*H04W 68/00* (2009.01)
*H04W 88/06* (2009.01)

(52) U.S. Cl.
CPC .............. *H04W 12/06* (2013.01); *H04L 63/20* (2013.01); *H04W 68/00* (2013.01); *H04W 88/06* (2013.01)
USPC .......................................................... 455/411

(58) Field of Classification Search
USPC ................................................. 455/411, 436
See application file for complete search history.

(56) References Cited

U.S. PATENT DOCUMENTS

| | | | |
|---|---|---|---|
| 2010/0067493 A1* | 3/2010 | Mahdi | 370/332 |
| 2011/0069618 A1* | 3/2011 | Wong et al. | 370/244 |
| 2011/0176680 A1* | 7/2011 | Wu | 380/277 |
| 2011/0200011 A1* | 8/2011 | Rune | 370/331 |
| 2011/0216645 A1* | 9/2011 | Song et al. | 370/216 |
| 2011/0230192 A1* | 9/2011 | Tiwari | 455/436 |
| 2011/0230193 A1* | 9/2011 | Vikberg et al. | 455/436 |
| 2011/0274085 A1* | 11/2011 | Geary et al. | 370/331 |
| 2011/0299682 A1* | 12/2011 | Hallenstal et al. | 380/247 |
| 2012/0170503 A1* | 7/2012 | Kelley et al. | 370/312 |

OTHER PUBLICATIONS

3GPP, "3rd Generation Partnership Project; Technical Specification Group Services and System Aspects; Circuit Switched (CS) Fallback in Evolved Packet System (EPS); Stage 2 (Release 9)," 3GPP TS 23.272, V9.4.0, Jun. 2010, 71 pages.

* cited by examiner

*Primary Examiner* — Kwasi Karikari
(74) *Attorney, Agent, or Firm* — Ryan, Mason & Lewis, LLP

(57) ABSTRACT

Techniques include, in response to a first communication network of a hybrid communication system being aware of a potential for a mismatch of reported authentication parameters associated with a second communication network of the hybrid communication system, wherein the first communication network is used to transport the reported authentication parameters to the second communication network, the first communication network preventing the mismatch of the reported authentication parameters. In one example, the first communication network is an LTE network and the second communication network is a CDMA2000 network.

25 Claims, 8 Drawing Sheets

100

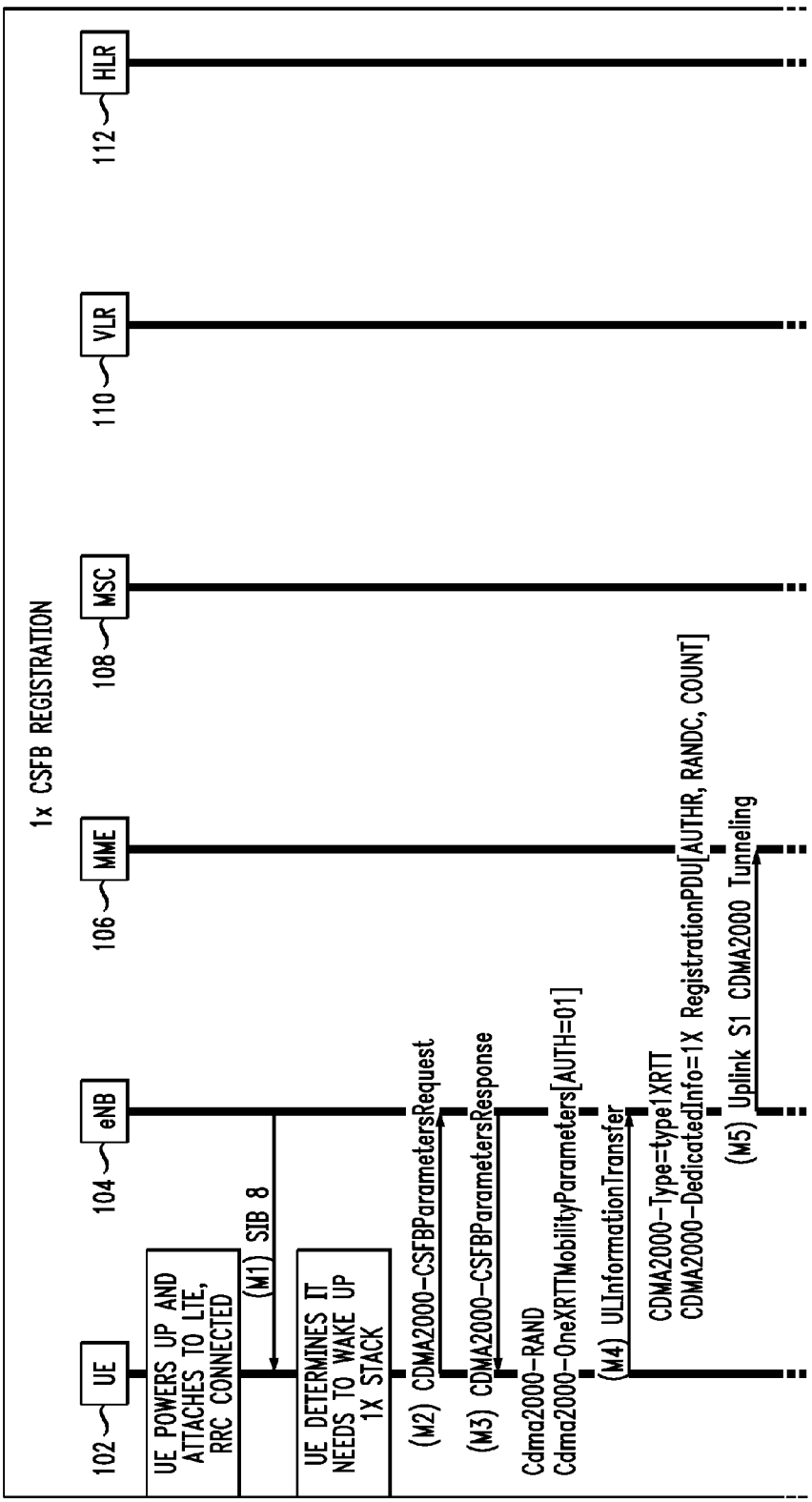

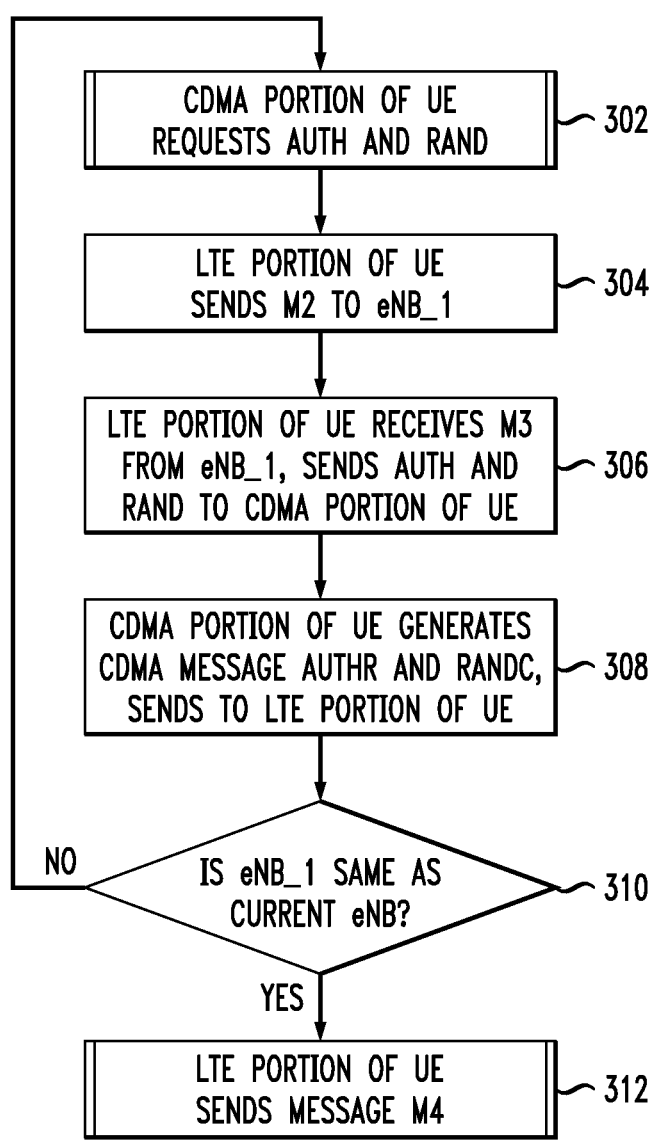

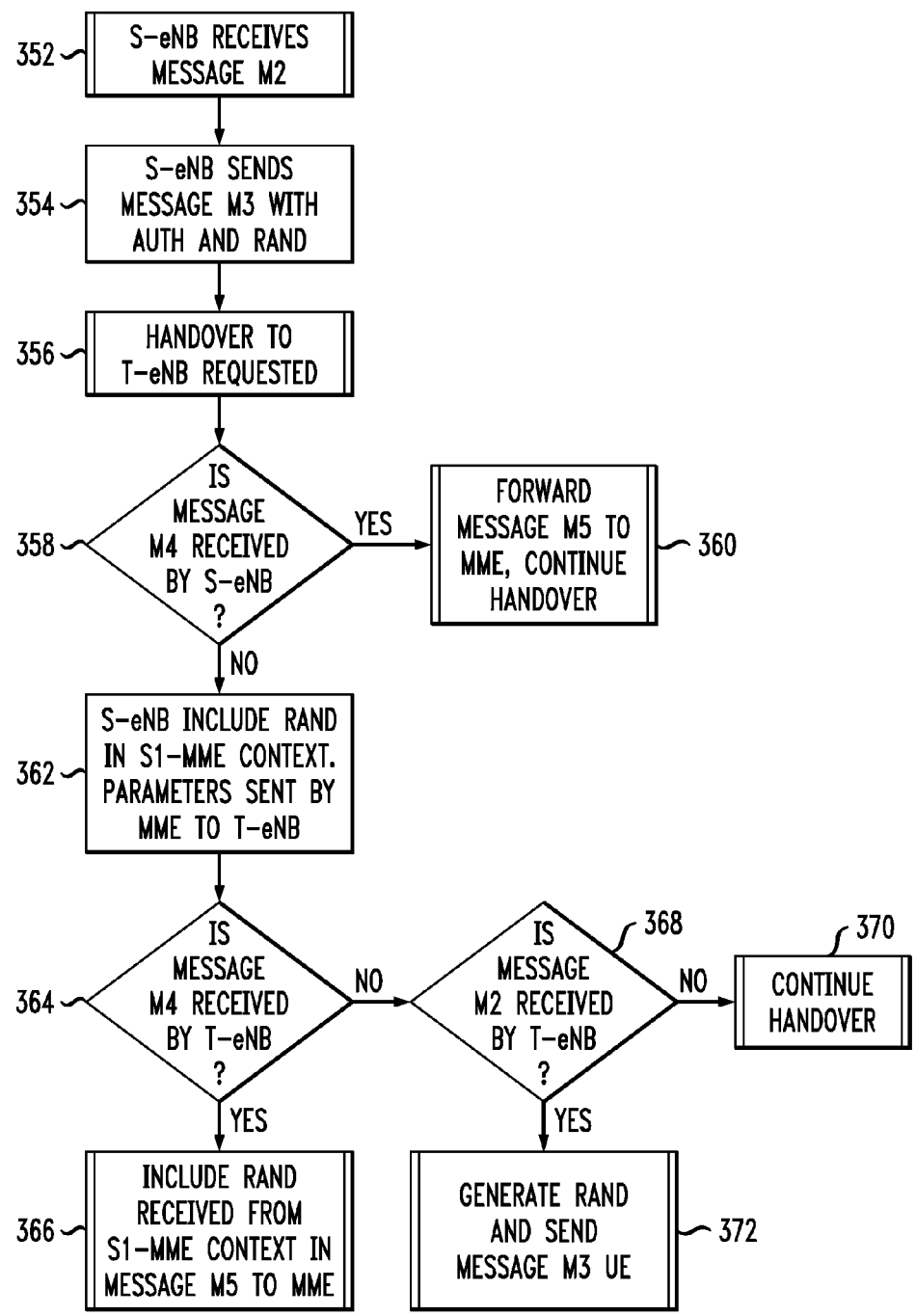

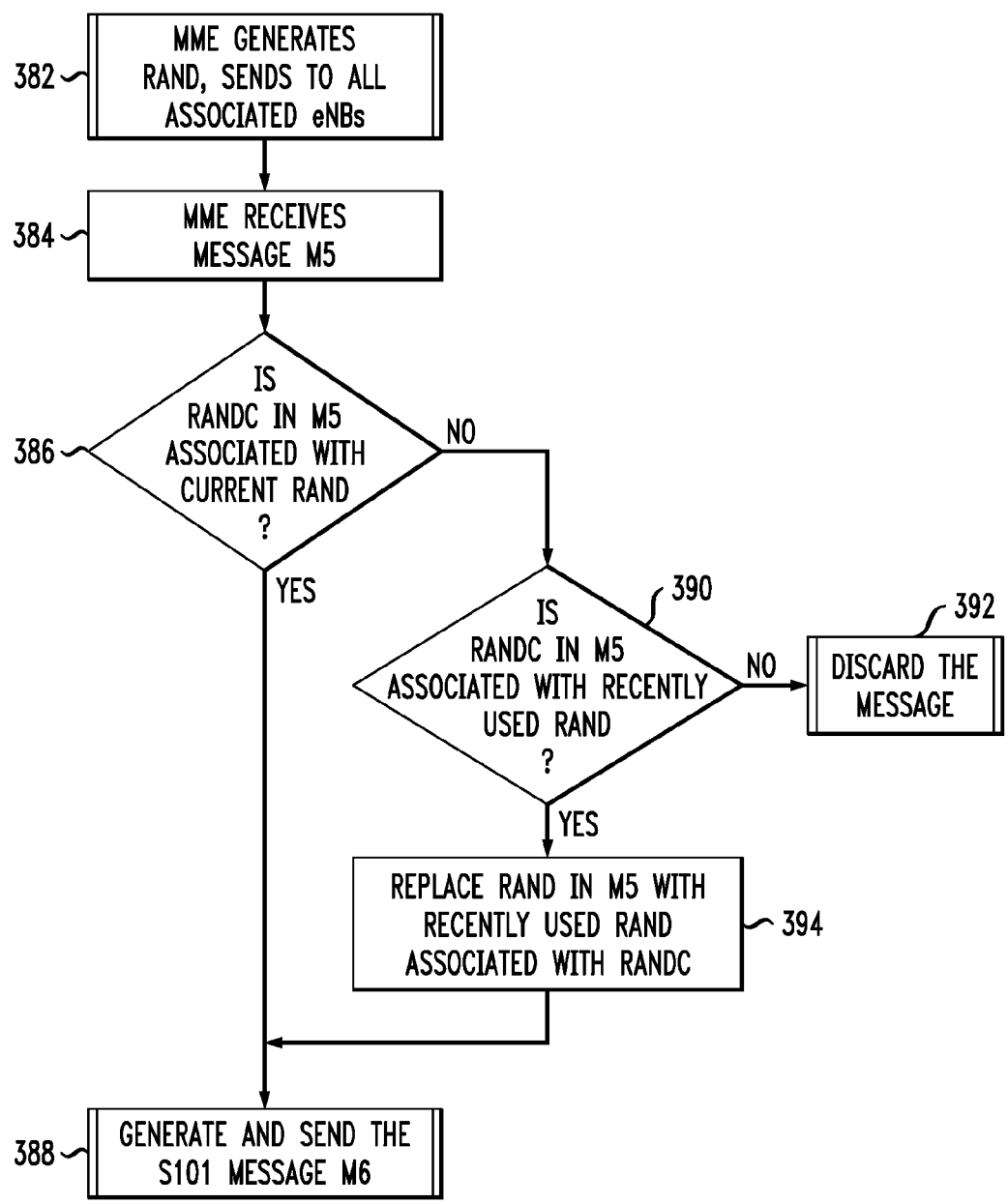

PREVENTION OF MISMATCH OF AUTHENTICATION PARAMETER IN HYBRID COMMUNICATION SYSTEM

FIELD OF THE INVENTION

The present invention relates generally to communication security and, more particularly, to techniques for preventing mismatch of an authentication parameter in a hybrid communication system.

BACKGROUND OF THE INVENTION

It is known that CDMA2000 is a third generation (3G) communication network technology that was developed by 3GPP2 (3rd Generation Partnership Project-2). CDMA2000 uses code division multiple access (CDMA) channel access technology to send circuit-based voice, circuit and packet data, and signaling data between mobile devices and cellular (cell) sites. CDMA2000 1x, also known as 3G1x and 1xRTT, is the air interface (radio access technology) for mobile devices accessing a CDMA2000 network. It is also known that the CDMA2000 1xEV-DO, also known as HRPD (High Rate Packet Data), is the 3G radio access technology also defined by 3GPP2 for packet data services.

Further, it is known that the Long Term Evolution (LTE) network is a 3GPP (Third Generation Partnership Project)-specified network that was developed to improve upon existing 3GPP 3G standards such as UMTS (Universal Mobile Telecommunications System) and GPRS (Generalized Packet Radio Service), and provide an enhanced user experience and simplified technology for next generation (4G) mobile broadband. LTE radio access technology is known as Evolved UMTS Terrestrial Radio Access (E-UTRA) and the network is known as an Evolved Packet System (EPS).

Given the various network protocols and radio access technologies that are available, and given the fact that communication systems tend to be hybrid in nature (e.g., use two or more radio access technologies or network protocols) while one or more newer communication standards gradually replace one or more older communication standards, it is known that manufacturers of mobile equipment (e.g., smartphones, portable computers, etc.) design their mobile equipment with the capability to operate via multiple radio access technologies and network protocols. Thus, certain mobile equipment (mobile device) is known to have "multi-mode" capability so as to be able to selectively operate in one of two modes such as, for example, an LTE mode or a CDMA2000 mode. Thus, as the mobile device roams in the communication system, it can access the system via whatever mode or modes are available in a given geographic area.

SUMMARY OF THE INVENTION

Embodiments of the invention realize that there can be mismatch problems that arise when a multi-mode mobile device communicates in a hybrid communication system. For example, embodiments of the invention provide techniques for preventing mismatch of an authentication parameter in a hybrid communication system.

For example, in one aspect of the invention, a method comprises, in response to a first communication network of a hybrid communication system being aware of a potential for a mismatch of reported authentication parameters associated with a second communication network of the hybrid communication system, wherein the first communication network is used to transport the reported authentication parameters to the second communication network, the first communication network preventing the mismatch of the reported authentication parameters.

In one embodiment, the mismatch prevention is implemented in a portion of user equipment that supports operations in the first communication network. In such case, the portion of user equipment that supports operations in the first communication network notifies a portion of the user equipment that supports operations in the second communication network that a previous registration process failed, and the latter portion re-initiates the registration process.

In another embodiment, the mismatch prevention is implemented in one or more base stations. In such case, during a handover scenario, a serving base station informs a target base station about a current authentication parameter via a context transfer message. The message may be sent directly to the target base station from the serving base station, or it may be passed to the target base station through another network element (i.e., a mobility management entity).

In a further embodiment, the mismatch prevention is implemented in a mobility management entity. In such case, the mobility management entity periodically and frequently changes global challenge authentication parameters sent to a plurality of base stations. The mobility management entity maintains a history of periodically and frequently changed global challenge authentication parameters sent to the plurality of base stations. The mobility management entity associates the global challenge authentication parameter received from a given base station of a plurality of base stations as a part of registration process with one of plurality of global challenge authentication parameters maintained in a history of global challenge authentication parameters sent to a plurality of base stations. The mobility management entity includes the global challenge authentication parameter received from a given base station as a part of the registration process with the found associated global challenge authentication parameter from a maintained history into an inter-technology registration message sent to the second communication network.

Advantageously, the methodologies of the invention can prevent mismatch of a global challenge authentication parameter in a hybrid communication system. In one embodiment, by way of example only, such mismatch prevention is realized when a mobile device communicates through an LTE network portion of a communication system but, in anticipation of a handover to the CDMA2000 network, executes the authentication transaction specified for a CDMA200 network portion of the communication system, e.g., one involving a global challenge authentication parameter. Furthermore, the reported authentication parameters may be part of a CDMA2000 circuit switched fallback (CSFB) registration protocol.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3A illustrates an authentication parameter mismatch prevention methodology according to an embodiment of the invention.

FIG. 3C illustrates an authentication parameter mismatch prevention methodology according to a further embodiment of the invention.

FIG. 3D illustrates an authentication parameter mismatch prevention methodology according to yet another embodiment of the invention.

DETAILED DESCRIPTION OF PREFERRED EMBODIMENTS

Embodiments of the present invention realize the need to properly authenticate messages in hybrid communication systems. In the embodiments to follow, a hybrid LTE/CDMA2000 communication system will be used to illustratively describe the security techniques and mechanisms of the invention. More particularly, embodiments of the invention concern the CDMA2000 1xRTT air interface. However, it is to be understood that the principles of the present invention are not limited to hybrid communication systems with LTE and CDMA2000 communication modes but rather are more generally suitable for a wide variety of other hybrid communication systems in which it would be desirable to prevent mismatch of an authentication parameter in a hybrid communication system.

As used herein, the phrase "hybrid communication system" generally refers to a communication system that supports two or more communication modes. "Communication mode" (or simply "mode") generally refers to an operation mode that supports a particular radio access technology and/or network protocol that is used to provide communication and access features for a particular type of communication network. By way of example, communication modes that are part of an illustrative hybrid communication system described herein include an LTE communication mode and a CDMA2000 communication mode.

Figure 1:
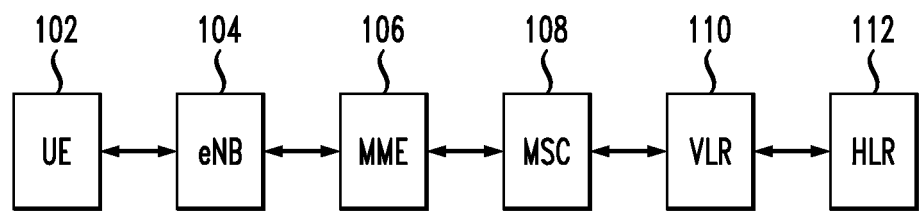
FIG. 1 illustrates a portion of a hybrid communication system in which one or more embodiments of the invention may be implemented.

FIG. 1 illustrates a portion of a hybrid communication system 100 in which one or more embodiments of the invention may be implemented. In particular, FIG. 1 shows relevant parts of an illustrative hybrid communication system 100. It is assumed that the network architecture shown supports both LTE and CDMA2000 communication modes.

As depicted, the communication system 100 includes a mobile device (user equipment or UE) 102, an eUTRAN base station (eNodeB, or eNB for short) 104, an LTE mobility management entity (MME) 106, a CDMA2000 1xRTT mobile switching center (MSC) 108, a CDMA2000 1xRTT visiting location register (VLR) 110 and a CDMA2000 1xRTT home location register (HLR) 112. It is to be understood that the figure includes components of the communication system that are useful for an understanding of one or more embodiments of the invention. Thus, other components may be part of the system such as, but not limited to, additional mobile devices (UEs), additional base stations (eNBs) and/or additional network support and switching subsystems.

Examples of a mobile device or user equipment may include, but are not limited to, a mobile or cellular (cell) telephone such as a so-called "smartphone," a portable computer, a wireless email device, a tablet, a personal digital assistant (PDA) or some other user mobile communication device used by a subscriber.

As is known, the eNB 104 provides an interface between the UE 102 and the communication system. The MME 106 is the main control node for the LTE access network. The MSC 108 provides switching functions to the CDMA2000 1xRTT communication system as well as connections to other networks and systems. The HLR 112 stores information of CDMA2000 1xRTT subscribers belonging to the coverage area of the MSC including the current location of the subscribers and the services to which they have access. The VLR 110 stores information from a subscriber's HLR needed to provide the subscribed services in a local serving system to a visiting mobile device. Thus, the VLR requests necessary information (including authentication data) from the HLR of the visiting mobile device's home network when the mobile device enters the coverage area of the MSC so that the requested service can be provided to the visiting mobile device.

As mentioned above, other communication network components are typically utilized in providing the above-mentioned and other functions but are not shown in FIG. 1 for the sake of simplicity and clarity of understanding.

Thus, it is realized that in complex multi-technology interworking scenarios, when a multi-mode mobile device can use services offered by an LTE network as well as a CDMA2000 circuit-switched network, communication parameters of one technology (e.g., CDMA2000) need to be made available to the mobile device even if it currently communicates through another technology (e.g., LTE).

Specifically, the 3GPP Circuit Switched Fallback (CSFB) standard, designated as 3GPP Technical Specification (TS) 23.272, the disclosure of which is incorporated by reference herein in its entirety, defines the mode of operation when the mobile device or user equipment (UE 102 in FIG. 1) communicates with the LTE network, via a 3GPP eNB (104 in FIG. 1), and intends to either request a CDMA2000 (3GPP2 3G1x) service, or simply conduct a CDMA2000 (3GPP2 3G1x) registration.

In such a case, the CDMA2000 message that would normally be transmitted by the multi-mode UE on the 3G1x access channel would instead be encapsulated by the mobile device in the LTE NAS (Non Access Stratum) signaling, and sent through the 3GPP LTE eNB (104 in FIG. 1) to the 3GPP LTE MME (106 in FIG. 1). The MME would re-encapsulate this message into the 3GPP S102 interface specifically defined for interworking with the CDMA2000 MSC (108 in FIG. 1), and send it as an IOS (interoperability specification) A21 message to the CDMA2000 network. The CDMA2000 network would process this message as if it were received from this mobile device through the 3G1x access, and respond in-kind through the S102 interface, thus completing the CDMA2000 transaction through the LTE tunneling.

It is realized that, while generating and completing this transaction, one cannot overlook the need to support the 3G1x authentication feature defined in CDMA2000, specifically when it is based on global challenge authentication.

In existing 3G1x system, the support and requirement for global challenge authentication is indicated to the mobile device by the serving base station with the AUTH (authentication) parameter in the Access Parameters message broadcasted as the part of overhead message stream on the forward common control channel (Paging Channel). If AUTH indicates that global challenge authentication needs to be performed, the serving base station also includes the global random challenge parameter RAND in the same message.

While assembling the message to be sent to the network, the mobile device uses the latest RAND received from the most recent Access Parameters message, and hashes it with its secret key, the so-called shared secret data (SSD), to produce a unique response AUTHR to this random challenge. It should be noted that other parameters, such as the mobile's identity (MIN, IMSI, ESN), are also part of this secure hash but not relevant to this description.

The AUTHR is attached to the 3G1x message sent to the network, thus authenticating the sender of it, i.e., the legitimate mobile device that knows the secret SSD.

Because the RAND is broadcasted as a part of the overhead message stream, it is "globally" available to all mobile devices trying to access the current base station. Therefore, it is called the global challenge RAND, and the associated AUTHR is called the global challenge response. Because each mobile device has a unique identity, and a unique secret SSD, the AUTHR would be unique for each mobile device.

To deter possible replay attacks, the value of RAND is periodically, and quite often, changed. This allows maintaining unpredictability of AUTHR generated by the same mobile device for messages sent at different times. To identify which RAND was used by the mobile device when computing the AUTHR, the mobile device also includes the most significant part of the used RAND, called RANDC, in the same message carrying the AUTHR.

The CDMA2000 MSC/VLR (108/110 in FIG. 1) recovers the RAND that matches the RANDC received from the mobile device (UE 102 in FIG. 1), and computes the expected value of the AUTHR which is then compared with the received AUTHR value. If values match, the authentication is declared a success, otherwise the received message is discarded.

In 3G1x-LTE interworking model, it was decided that sending the CDMA 3G1x overhead message stream tunneled in the LTE messages would be too complex and inefficient. Instead, all relevant CDMA access parameters would be either pre-configured at or generated by the 3GPP LTE eNB. The LTE Radio Resource Control (RRC) messages would be used to send these parameters to the mobile device on request, when the mobile device needs to communicate a signaling message to the 3G1x system.

Specifically, the AUTH parameter would be pre-configured at the eNB, and the RAND parameter would be generated by the eNB.

Figure 2:
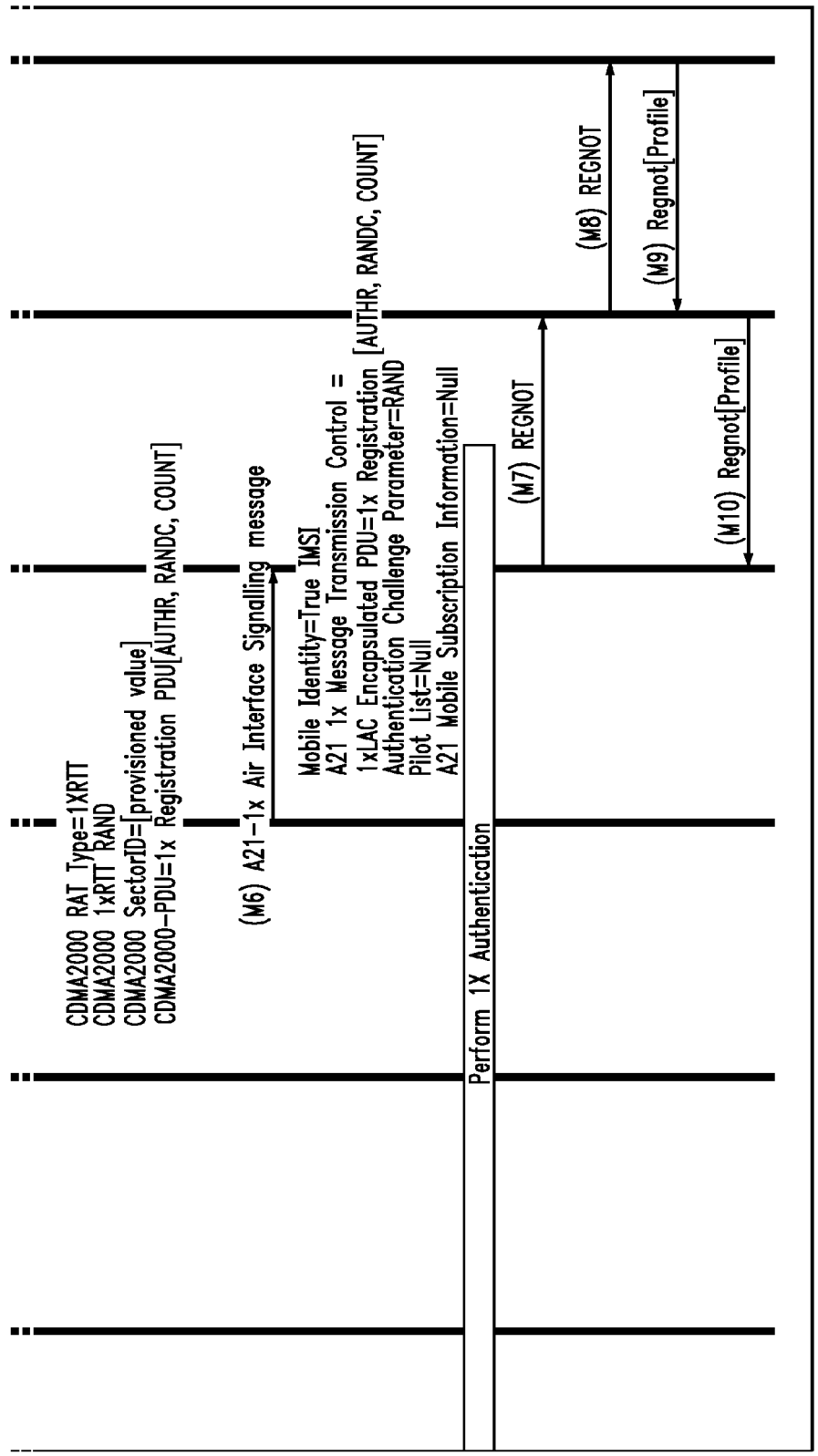
FIG. 2 illustrates a circuit switched fallback registration protocol in which one or more embodiments of the invention may be implemented.

In a specific operational example shown in protocol 200 in FIG. 2, when the CDMA portion of the mobile device (UE 102) needs to perform a timer-based registration, it will inform the LTE portion of the mobile device that it needs the AUTH and RAND. The LTE portion of the mobile device generates and sends the LTE RRC Message "Cdma2000-CSFB-Parameters-Request" (message M2 in FIG. 2) asking for access parameters needed for creating the CDMA2000 message. Considering practical deployments with multiple multi-mode mobiles requesting tunneled authentication through the 3GPP eNB, it is very likely that the eNB will not generate individual random RAND for every "Cdma2000-CSFB-Parameters-Request", but rather generate and maintain a single frequently changed RAND which is returned to all mobiles requesting it. The eNB 104 returns the AUTH and RAND in the message M3 "Cdma2000-CSFB-Parameters-Response." These parameters are communicated to the CDMA2000 portion of the mobile device, and the CDMA2000 message is created including the required AUTHR and RANDC. Note that the phrase "LTE portion of the mobile device" refers to the resources (e.g., hardware and/or software, and the like) in the user equipment that support the LTE functionalities of the multi-mode mobile device. Likewise, the phrase "CDMA2000 portion of the mobile device" refers to the resources in the user equipment that supports the CDMA2000 functionalities of the multi-mode mobile device.

The eNB 104 that received this message from the mobile device 102 adds to it the value of the RAND that was sent to the mobile device in the message M2, and forwards the package to the MME 106 in message 5, which will include it in the S102 as the IOS payload.

However, we have realized two major problems with the above approach to handling these authentication parameters.

First, the RANDC returned by the mobile device is included in the IOS payload which is a part of the NAS payload encapsulated into the RRC message, most likely encrypted with the NAS security that extends between the UE and the MME, and therefore is not seen by the RRC layer of the eNB. Therefore, the eNB cannot associate it with the RAND if the value of the RAND recently got changed. As the result, the RANDC sent by the mobile device and the RAND included by the eNB may become mismatched (mis-synchronized). Similarly, the MME that may parse the NAS payload containing the RANDC cannot associate it with the RAND because the RAND was generated by the eNB, and not the MME, and so the mismatch will be sent through the S102 unnoticed. Rightfully, the first entity that has to process the CDMA2000 IOS message is the 3GPP2 MSC that terminates the A21 interface. Therefore, the 3GPP2 MSC is the first logical entity that will have knowledge of the RANDC value. But it is incapable of knowing what RAND was generated by the LTE eNB at the time of the "Cdma2000-CSFB-Parameters-Response" message M3, and so there could be a mismatch between received RAND and RANDC values at the 3GPP2 MSC. Such mismatch will cause failure of authentication, and unconfirmed failure of the registration process. As a result, the mobile device will become unreachable at least until the next registration, which is hopefully successful. This is a major problem caused by layering violation.

Second, if the mobile device conducts an LTE handover from one eNB (serving eNB) to another eNB (target eNB) while in a process of preparing the CDMA2000 message, the value of the RAND sent to it by the source eNB in the message M3 will not be known to the target eNB when it receives the tunneled message M4 from the mobile device. Existing LTE specifications do not provide for communication of this parameter between the eNBs in the handoff context transfer. As a result, the target eNB will simply include its own most recent RAND in the S102 message, the 3GPP2 MSC will either discover a mismatch between RANDC and RAND and discard the message, or it will run the authentication algorithm with the wrong value of RAND, and will find that the AUTHR failed verification. The message will still be discarded, and registration will not succeed. Up until the next periodic registration, the mobile device will become unreachable through the CDMA2000 system.

Embodiments of the invention provide solutions to the above mismatch problems. In one or more other embodiments, solutions are implemented at the mobile device. In one or more other embodiments, solutions are implemented at the eNB. In one or more further embodiments, solutions are implemented at the MME.

A. Mobile-Based Solution

Note that the LTE portion of the mobile device remembers from which eNB the global RAND was received as a part of the CDMA2000-CSFB-Parameters-Response message (e.g., the mobile device stores the unique identifier of the eNB). If at the time when the CDMA2000 message is presented to it from the CDMA2000 portion of the mobile device, the LTE portion of the mobile device communicates with another eNB, an internal trigger is advantageously sent to the CDMA2000 portion of the mobile informing it that a previous transaction, such as a CDMA2000 registration, failed. The CDMA2000 portion of the mobile device then initiates that transaction again, starting from the message M2 requesting the set of CDMA2000 parameters, i.e., the message CDMA2000-CSFB-Parameters-Request is sent again to the LTE system through the new eNB. This solution is illustrated in FIG. 3A.

More particularly, FIG. 3A illustrates a mobile-based methodology 300 for preventing mismatch of the RAND parameter in an LTE/CDMA (hybrid) communication system according to an embodiment of the invention.

In step 302, the CDMA portion of the UE (mobile device) requests AUTH and RAND.

In step 304, the LTE portion of the UE sends the M2 message to eNB_1.

In step 306, the LTE portion of the UE receives the M3 message from eNB_1, and sends AUTH and RAND to the CDMA portion of the UE.

In step 308, the CDMA portion of the UE generates the CDMA message with AUTHR and RANDC, and sends the message to the LTE portion of the UE.

In step 310, the LTE portion of the UE determines whether or not eNB_1 is the same as the current eNB. If not, the methodology returns to step 302 where the CDMA portion of the UE initiates the transaction again.

However, if eNB_1 is the same as the current eNB, then in step 312, the LTE portion of the UE sends the M4 message.

B. eNB-Based Solution

1. Solution Based on the X2 Context Transfer

In the process of eNB handoff, the serving eNB (S-eNB) normally executes the context transfer to the target eNB (T-eNB). This transfer is normally done through the X2 interface. The solution involves the S-eNB including in this context the last RAND value that was sent to the mobile device before the handoff, if the ULInformationTransfer message (M4) from the mobile device is not received prior to the handoff.

If the T-eNB receives the ULInformationTransfer message (M4) from the mobile device without first receiving the CDMA2000-CSFB-Parameters-Request message (M2), the T-eNB advantageously includes the RAND value received from the S-eNB in the UL S1 CDMA2000-Tunneling message (M5) it sends to the MME. Otherwise, if the CDMA2000-CSFB-Parameters-Request (M2) is received from the mobile device, the T-eNB generates its own random RAND, sends it to the mobile device in CDMA2000-CSFB-Parameters-Response (M3), and includes this RAND in the UL S1 CDMA2000-Tunneling message (M5) to the MME.

This solution does not increase the handoff latency, and does not increase the number of messages. Advantageously, it only involves defining one new information element RAND in the X2 signaling between S-eNB and T-eNB. This solution is illustrated in FIG. 3B.

Figure 3B:
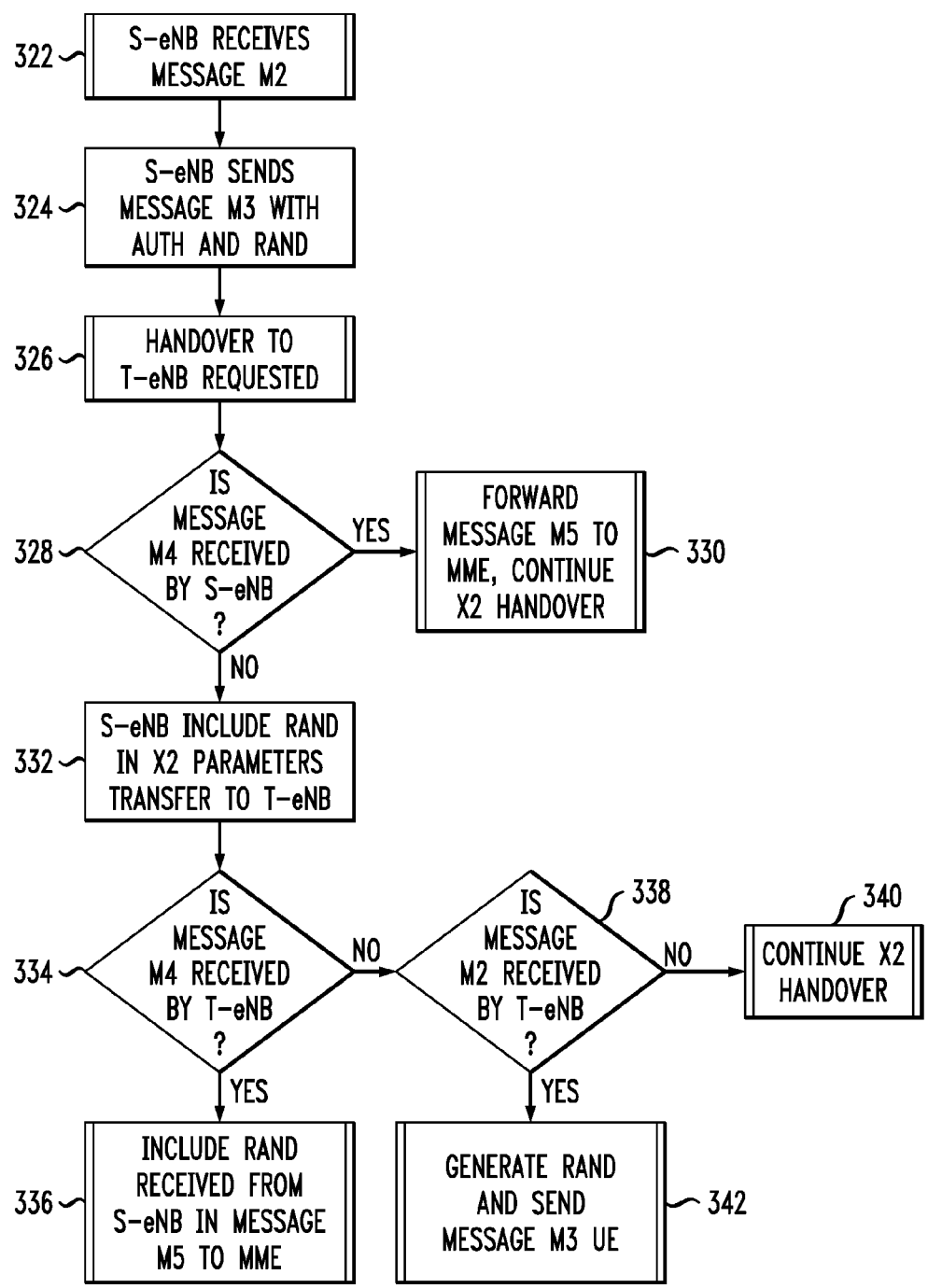
FIG. 3B illustrates an authentication parameter mismatch prevention methodology according to another embodiment of the invention.

More particularly, FIG. 3B illustrates an eNB-based methodology 320 for preventing mismatch of the RAND parameter in an LTE/CDMA (hybrid) communication system according to an embodiment of the invention.

In step 322, the S-eNB receives the M2 message from the UE (mobile device).

In step 324, the S-eNB sends the M3 message with AUTH and RAND to the UE.

In step 326, a handover to the T-eNB is requested.

In step 328, it is determined whether or not the M4 message was received by the S-eNB. If yes, then in step 330, the S-eNB forwards the M5 message to the MME, and the X2 handover continues.

However, if the M4 message was not received by the S-eNB, then in step 332, the S-eNB includes RAND in X2 parameters transferred to the T-eNB.

In step 334, it is determined whether or not the M4 message was received by the T-eNB. If yes, then in step 336, the T-eNB includes the RAND, received from the S-eNB, in the M5 message sent to the MME.

However, if the M4 message was not received by the T-eNB, then in step 338, it is determined whether or not the M2 message was received by the T-eNB. If no, then in step 340, the X2 handover continues.

However, if the M2 message was received by the T-eNB, then in step 342, the T-eNB generates RAND and sends it to the UE in the M3 message.

2. Solution Based on the S1 Context Transfer

In the process of eNB handoff, the serving eNB (S-eNB) normally executes the context transfer to the target eNB (T-eNB). LTE standards also specify transfer of this context via the MME through the S1 interface. The solution involves the S-eNB including in this context the last RAND value that was sent to the mobile device before the handoff, if the ULInformationTransfer message (M4) from the mobile device is not received prior to the handoff.

If the T-eNB receives the ULInformationTransfer message (M4) from the mobile device without first receiving the CDMA2000-CSFB-Parameters-Request message (M2), the T-eNB uses the RAND value received from the S-eNB in the context transfer through the MME, and includes this RAND in the UL S1 CDMA2000-Tunneling message (M5) it sends to the MME. Otherwise, if the CDMA2000-CSFB-Parameters-Request (M2) is received from the mobile device, the T-eNB generates its own random RAND, sends it to the mobile device in CDMA2000-CSFB-Parameters-Response (M3), and includes this RAND in the UL S1 CDMA2000-Tunneling message (M5) to the MME.

This solution does not increase the handoff latency, and does not increase the number of messages. Advantageously, it only involves defining one new information element RAND in the S1 signaling between the eNB and the MME. This solution is illustrated in FIG. 3C.

More particularly, FIG. 3C illustrates an eNB-based methodology 350 for preventing mismatch of the RAND parameter in an LTE/CDMA (hybrid) communication system according to another embodiment of the invention.

In step 352, the S-eNB receives the M2 message from the UE (mobile device).

In step 354, the S-eNB sends the M3 message with AUTH and RAND to the UE.

In step 356, a handover to the T-eNB is requested.

In step 358, it is determined whether or not the M4 message was received by the S-eNB. If yes, then in step 360, the S-eNB forwards the M5 message to the MME, and the handover continues.

However, if the M4 message was not received by the S-eNB, then in step 362, the S-eNB includes RAND in S1-MME context. Then, the authentication parameters are sent by the MME to the T-eNB.

In step 364, it is determined whether or not the M4 message was received by the T-eNB. If yes, then in step 366, the T-eNB includes the RAND, received from the S1-MME context, in the M5 message sent to the MME.

However, if the M4 message was not received by the T-eNB, then in step 368, it is determined whether or not the M2 message was received by the T-eNB. If no, then in step 370, the handover continues.

However, if the M2 message was received by the T-eNB, then in step 372, the T-eNB generates RAND and sends it to the UE in the M3 message.

C. MME-Based Solution

In this solution, the RAND parameter is frequently and periodically generated by the MME and distributed to all associated eNB subsystems simultaneously. In such case, the value of the RAND in all eNB subsystems is synchronized at all times.

The assumption is that all CDMA2000 access parameters will be provisioned by the CDMA2000 system into the MME anyway, and thus have to be shared with the eNB subsystems for generating the CDMA2000-CSFB-Parameters-Response messages (M3) on request from the mobile devices. Even though most of these configuration parameters do not change as frequently as the RAND, there is still enough control signaling between the MME and eNB on the S1 interface to warrant one more periodic message containing a recently changed RAND value.

With this solution, two simultaneous benefits are achieved:

(1) All eNB subsystems within a cluster managed by the MME have the same fully synchronized RAND value at all times, so problem 1 above is addressed.

(2) When the MME receives the UL S1 CDMA2000-Tunneling message (M5) from the eNB containing the RAND and RANDC, the MME can verify that the RAND used by the mobile device (identified by the RANDC) is the same as the RAND included by the eNB, and if not, the MME would overwrite the RAND in the message with the correct value. This completely negates problem 1 and addresses problem 2, although the MME will need to parse and process the payload of the NAS message to be forwarded through the S102 interface in order to recognize the value of RANDC send by the mobile in the CDMA2000 message payload.

This approach, however, needs to have special handling in an MME-Flex architecture, in which any eNB in the cluster can communicate with any MME in the region. In such an architecture, each eNB maintains the cache of RAND values distributed by each MME with which they communicate. When the UE requests parameters, the eNB responds with the currently valid RAND value sent from the MME to which the UE is attached.

The case of eNB-eNB handover within the same MME is addressed by this solution. This solution is illustrated in FIG. 3D.

More particularly, FIG. 3D illustrates an MME-based methodology 380 for preventing mismatch of the RAND parameter in an LTE/CDMA (hybrid) communication system according to an embodiment of the invention.

In step 382, the MME generates RAND, and sends it to all associated eNBs.

In step 384, the MME receives the M5 message.

In step 386, it is determined whether or not the RANDC in the M5 message is associated with the current RAND. If yes, then in step 388, the MME generates the S101 M6 message and sends it to the MSC.

However, if the RANDC in the M5 message is not associated with the current RAND, then in step 390, it is determined whether or not the RANDC in the M5 message is associated with the recently used RAND. If no, then the M5 message is discarded in step 392.

However, if the RANDC in the M5 message is associated with the recently used RAND, then in step 394, the MME replaces the RAND in the M5 message with the recently used RAND associated with RANDC. Then the methodology proceeds to step 388, i.e., the MME generates the S101 M6 message and sends it to the MSC.

Thus, advantageously, the MME associates the global challenge authentication parameter received from a base station with one of plurality of global challenge authentication parameters maintained by the MME in a history of global challenge authentication parameters sent to a plurality of base stations. The MME then includes the global challenge authentication parameter received from the given base station with the found associated global challenge authentication parameter from the maintained history into an inter-technology registration message sent to the MSC.

Figure 4:
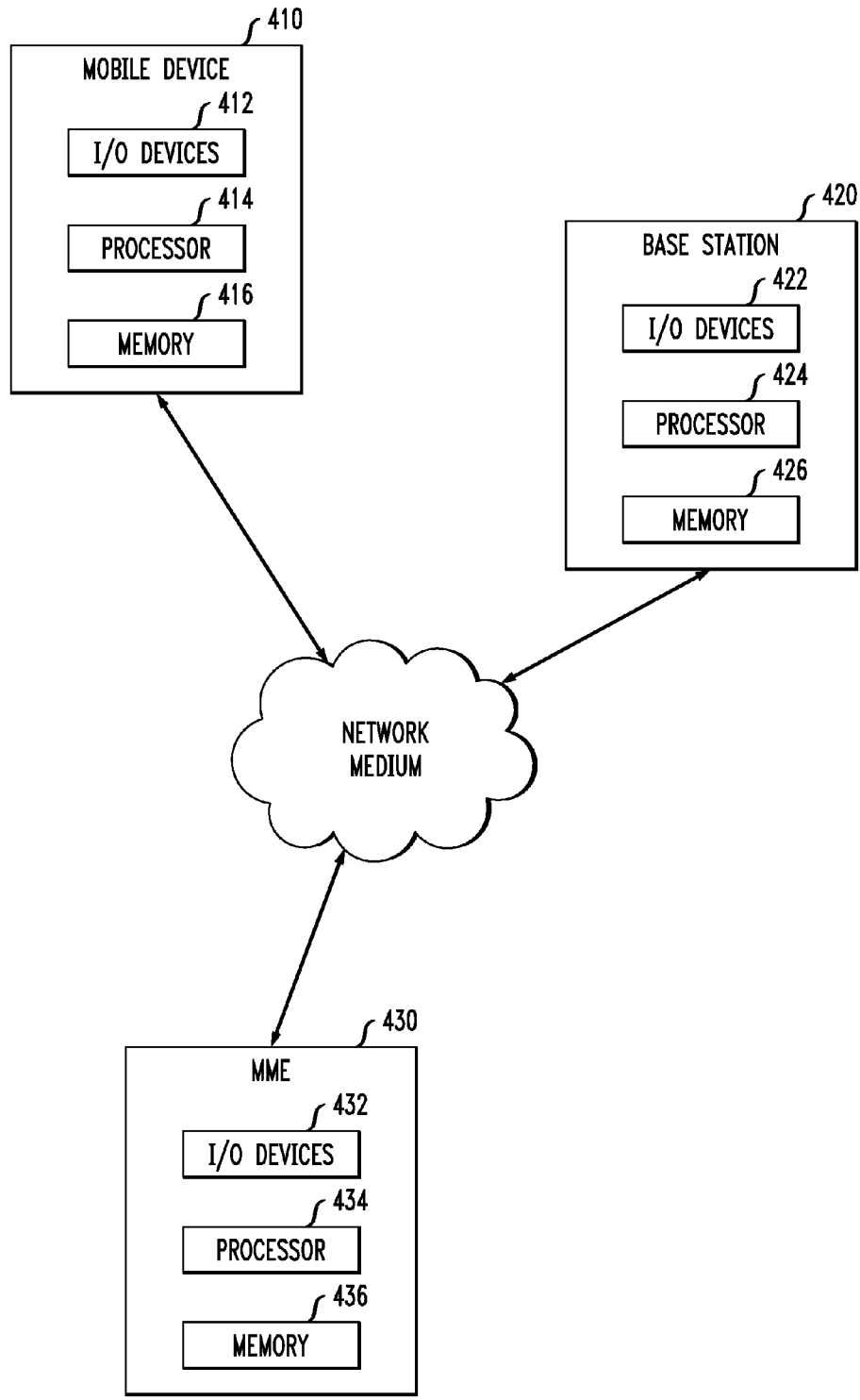
FIG. 4 illustrates a hardware architecture of a part of a communication system and computing devices suitable for implementing one or more of the methodologies and protocols according to one or more embodiments of the invention.

Lastly, FIG. 4 illustrates a generalized hardware architecture of a part of a hybrid communication system 400 suitable for implementing authentication parameter mismatch prevention according to the above-described principles of the invention.

As shown, mobile device 410 (corresponding to UE 102), base station 420 (corresponding to eNB 104), and MME 430 (corresponding to MME 106) are operatively coupled via communication network medium 450. The network medium may be any network medium across which the mobile device, the base station, and the MME are configured to communicate. By way of example, the network medium can carry IP packets and may involve any of the communication networks mentioned above. However, the invention is not limited to a particular type of network medium. Not expressly shown here, but understood to be operatively coupled to the network medium, the mobile device and/or the MME, are the other network elements shown in or described in the context of FIGS. 1-3D (which can have the same processor/memory configuration described below).

As would be readily apparent to one of ordinary skill in the art, the elements may be implemented as programmed computers operating under control of computer program code. The computer program code would be stored in a computer (or processor) readable storage medium (e.g., a memory) and the code would be executed by a processor of the computer. Given this disclosure of the invention, one skilled in the art could readily produce appropriate computer program code in order to implement the protocols described herein.

Nonetheless, FIG. 4 generally illustrates an exemplary architecture for each device communicating over the network medium. As shown, mobile device 410 comprises I/O devices 412, processor 414, and memory 416. Base station 420 comprises I/O devices 422, processor 424, and memory 426. MME 430 comprises I/O devices 432, processor 434, and memory 436.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (410, 420, and 430) shown in FIG. 4 may be individually programmed to perform their respective steps of the protocols and functions depicted in FIGS. 1 through 3D. Also, it is to be understood that block 410, block 420, and block 430 may each be implemented via more than one discrete network node or computing device.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   in response to a first communication network of a hybrid communication system being aware of a potential for a mismatch of reported authentication parameters associated with a second communication network of the hybrid communication system, wherein the first communication network is used to transport the reported authentication parameters to the second communication network, the first communication network preventing the mismatch of the reported authentication parameters in the event that a mobile device accesses the hybrid communication system in a first communication mode supported by the first communication network but seeks to perform a registration process associated with a second communication mode supported by the second communication network;
   wherein the mobile device is configured to selectively operate in the first communication mode supported by the first communication network and the second communication mode supported by the second communication network, and the mobile device seeks to perform the registration process associated with the second communication mode using a global challenge authentication process; and
   wherein the method is performed at least in part by a processing device comprising a processor operatively coupled to a memory.

2. The method of claim 1, wherein the first communication network is a Long Term Evolution (LTE) network and the second communication network is a CDMA2000 network.

3. The method of claim 2, wherein the reported authentication parameters are part of a CDMA2000 circuit switched fallback (CSFB) registration protocol.

4. A method, comprising:
   in response to a first communication network of a hybrid communication system being aware of a potential for a mismatch of reported authentication parameters associated with a second communication network of the hybrid communication system, wherein the first communication network is used to transport the reported authentication parameters to the second communication network, the first communication network preventing the mismatch of the reported authentication parameters in the event that a mobile device accesses the hybrid communication system in a first communication mode supported by the first communication network but seeks to perform a registration process associated with a second communication mode supported by the second communication network;
   wherein the method is performed at least in part by a processing device comprising a processor operatively coupled to a memory; and
   wherein a first portion of the mobile device is configured to operate in the first communication mode supported by the first communication network and a second portion of the mobile device is configured to operate in the second communication mode supported by the second communication network, wherein the registration process comprises an initial registration attempt associated with the second communication mode using a global challenge authentication process, and wherein a global challenge authentication parameter recently changed thus causing the initial registration attempt to fail.

5. The method of claim 4, the mismatch prevention step further comprising the first portion of the mobile device receiving notification of the failure of the initial registration attempt from the second portion of the mobile device.

6. The method of claim 5, the mismatch prevention step further comprising the first portion of the mobile device performing a'subsequent registration attempt using the recently changed global challenge authentication parameter.

7. The method of claim 4, wherein the global challenge authentication parameter recently changed due to a change in the base station through which the mobile device accesses the hybrid communication system.

8. The method of claim 1, wherein the mobile device is involved in a handover from a serving base station to a target base station.

9. The method of claim 8, wherein the target base station receives a context transfer message which comprises a most recent global challenge authentication parameter that was generated by the serving base station and sent to the mobile device.

10. The method of claim 9, the mismatch prevention step further comprising the target base station sending the most recent global challenge authentication parameter that was received from the serving base station to a mobility management entity when the target base station receives a global challenge authentication parameter response from the mobile device without first receiving a global challenge authentication parameter request from the mobile device.

11. The method of claim 10, wherein the mismatch prevention step further comprising the target base station sending its own generated global challenge authentication parameter to the mobility management entity when the target base station receives a global challenge authentication parameter request and a global challenge authentication parameter response from the mobile device.

12. The method of claim 9, wherein the context transfer message is an X2 context transfer message.

13. The method of claim 12, wherein the X2 context transfer message is received by the target base station from the serving base station.

14. The method of claim 9, wherein the context transfer message is an S1-MME context transfer message.

15. The method of claim 14, wherein the S1-MME context transfer message is received by the target base station from the mobility management entity.

16. The method of claim 1, the mismatch prevention step further comprising a mobility management entity periodically generating a global challenge authentication parameter for use in the registration process.

17. The method of claim 16, the mismatch prevention step further comprising the mobility management entity sending the global challenge authentication parameter to a plurality of base stations associated therewith such that a base station of the plurality of base stations, through which the mobile device accesses the hybrid communication system, sends a most recent global challenge authentication parameter received from the mobility management entity to the mobile device upon receipt of a global challenge authentication request from the mobile device in conjunction with the registration process.

18. The method of claim 17, the mismatch prevention step further comprising the mobility management entity periodically and frequently changing the global challenge authentication parameters being sent to the plurality of base stations.

19. The method of claim 18, the mismatch prevention step further comprising the mobility management entity maintaining a history of periodically and frequently changed global challenge authentication parameters being sent to the plurality of base stations.

20. The method of claim 19, the mismatch prevention step further comprising the mobility management entity associating the global challenge authentication parameter received from a given base station of a plurality of base stations as a part of registration process with one of plurality of global challenge authentication parameters maintained in a history of global challenge authentication parameters sent to a plurality of base stations.

21. The method of claim 20, the mismatch prevention step further comprising the mobility management entity including the global challenge authentication parameter received from a given base station as a part of the registration process with the found associated global challenge authentication parameter from a maintained history into an inter-technology registration message sent to the second communication network.

22. An apparatus, comprising:
a memory; and
a processor operatively coupled to the memory and configured to:
in response to a first communication network of a hybrid communication system being aware of a potential for a mismatch of reported authentication parameters associated with a second communication network of the hybrid communication system, wherein the first communication network is used to transport the reported authentication parameters to the second communication network;
prevent the mismatch of the reported authentication parameters in the event that a mobile device accesses the hybrid communication system in a first communication mode supported by the first communication network but seeks to perform a registration process associated with a second communication mode supported by the second communication network;
wherein the mobile device is configured to selectively operate in the first communication mode supported by the first communication network and the second communication mode supported by the second communication network, and the mobile device seeks to perform the registration process associated with the second communication mode using a global challenge authentication process; and
wherein the memory and processor are part of the first communication network.

23. The apparatus of claim 22, wherein the memory and processor reside in a portion of user equipment that supports operations in the first communication network.

24. The apparatus of claim 22, wherein the memory and processor reside in a base station that supports operations in the first communication network.

25. The apparatus of claim 22, wherein the memory and processor reside in a mobility management entity that supports operations in the first communication network.

* * * * *